United States Patent [19]

Chen et al.

[11] Patent Number: 4,962,074
[45] Date of Patent: Oct. 9, 1990

[54] CATALYTIC CRACKING OF HYDROCARBONS WITH OXYGEN PROMOTED ALKALI METAL ZEOLITE CRACKING CATALYST

[75] Inventors: Nai Y. Chen, Titusville, N.J.; Thomas F. Degnan, Yardley, Pa.

[73] Assignee: Mobil Oil Corporation, New York, N.Y.

[21] Appl. No.: 360,501

[22] Filed: Jun. 2, 1989

[51] Int. Cl.$^5$ ............................................. B01J 29/06
[52] U.S. Cl. ................................................... 502/67
[58] Field of Search ............................................ 502/67

[56] References Cited

U.S. PATENT DOCUMENTS

| | | | |
|---|---|---|---|
| 3,530,064 | 9/1970 | Chen et al. | 208/113 |
| 4,239,654 | 12/1980 | Gladrow et al. | 502/67 |
| 4,312,743 | 1/1982 | Tu et al. | 502/67 |
| 4,522,705 | 6/1985 | Chu et al. | 502/67 |

Primary Examiner—Carl F. Dees

[57] ABSTRACT

A process for the catalytic cracking of a hydrocarbon oil is provided which comprises contacting the oil under cracking conditions with a large pore, alkali metal crystalline silicate zeolite cracking catalyst which is essentially free of shape selective combustion catalyst in the presence of a cracking-promoting amount of oxygen. A cracking catalyst of alkali metal zeolite and shape selective cracking catalyst is also disclosed.

11 Claims, No Drawings

CATALYTIC CRACKING OF HYDROCARBONS WITH OXYGEN PROMOTED ALKALI METAL ZEOLITE CRACKING CATALYST

RELATED APPLICATIONS

This is a divisional of copending application Ser. No. 292,691, filed on Jan. 3, 1989, U.S. Pat. No. 4,882,039 which is a continuation-in-part of copending application Ser. No. 937,938, filed Dec. 4, 1986, abandoned.

BACKGROUND OF THE INVENTION

This invention relates to the catalytic conversion of hydrocarbons, particularly high boiling hydrocarbon oils such as gas oils, to hydrocarbons of lower boiling range.

Hydrocarbon conversion processes utilizing crystalline zeolites and, in particular, crystalline aluminosilicate catalysts, have been the subject of considerable investigation as is apparent from both the extensive patent and scientific literature. Large pore crystalline silicate zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. As recognized in these patents, the as-synthesized zeolites, i.e., the zeolites substantially in the alkali metal form, are not suitable for cracking. The selectivity of alkali metal zeolites is extremely poor compared to the older amorphous silica-alumina cracking catalysts. In addition, certain alkali metal zeolites are quite unstable to steam treatment, such treatment being a necessary consequence of undergoing regeneration in a catalyst regeneration zone. For these reasons, the natural and synthetic alkali metal zeolites as found or synthesized must be modified in order to be rendered suitable for use in cracking operations. Specifically, the alkali metal zeolite must be base-exchanged to replace a substantial part of the alkali metal with protons. Alternatively, other cations, e.g., rare earth metal cations, can be used to displace alkali metal as disclosed in aforementioned U.S. Pat. No. 3,140,249.

U.S. Pat. No. 3,530,064 discloses a catalytic cracking process employing a large pore zeolite of relatively low alpha value such as dealuminized zeolite Y and a selective combustion catalyst such as platinum zeolite T. At least part of the heat demand of the endothermic cracking reaction is supplied in situ by the selective pyrolysis of a portion of the feed and/or reaction product. There is no recognition or appreciation in this patent that relatively minor amounts of oxygen will promote cracking with alkali metal zeolites.

SUMMARY OF THE INVENTION

It has been unexpectedly observed that small quantities of oxygen very effectively promote the catalytic cracking activity of alkali metal zeolites, materials which, as previously noted, are generally unsuitable for use as cracking catalysts unless a substantial part of their alkali metal content is replaced with protons or other metal cations.

Accordingly, the present invention provides a process for the catalytic cracking of a hydrocarbon oil which comprises contacting the oil with 0.001 to 0.1 weight parts of oxygen for each weight of oil at a temperature in excess of 1000° F. with a catalyst which is essentially free of shape selective combustion catalyst and comprising a large pore, alkali metal material silicate zeolite cracking catalyst.

In another embodiment, the present invention provides a catalytic cracking catalyst comprising a large pore alkali metal material, a shape selective zeolite having a Constraint Index of 1–12 and a silica:alumina ratio in excess of 12, said catalyst being essentially free of shape selective combustion catalyst.

As used herein, the expression "alkali metal large pore cracking component or alkali metal zeolite" contemplates zeolites or other large pore materials in which a substantial portion of the alkali metal content of the as-synthesized zeolite remains present in distinction to zeolite cracking catalysts such as those in U.S. Pat. No. 3,530,064, supra, in which a substantial portion of the alkali metal is replaced with protons or other metal cations.

DESCRIPTION OF THE PREFERRED EMBODIMENTS

The preferred catalyst comprises alkali metal crystalline silicate zeolites which are operable as cracking catalysts in the process of this invention. Suitable alkali metal zeolites are disclosed in U.S. Pat. No. 3,530,064 which is incorporated by reference. The catalyst includes a wide variety of aluminosilicates, both natural and synthetic. Aluminosilicates can be described as a three-dimensional framework of $SiO_4$ and $AlO_4$ tetrahedra in which the tetrahedra are cross-linked by the sharing of oxygen atoms whereby the ratio of total aluminum and silicon atoms to oxygen atoms is 1:2. The hydrated form of the aluminosilicates may be represented by the formula:

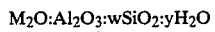

$$M_2O:Al_2O_3:wSiO_2:yH_2O$$

wherein M is an alkali metal, e.g., sodium, lithium or potassium, w represents the moles of $SiO_2$, and y represents the moles of $H_2O$. Although the proportions of inorganic oxides in the silicates and their spatial arrangement may vary, effecting distinct properties in the aluminosilicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework. In this respect, these characteristics are essential for obtaining catalyst compositions of high activity in accordance with the invention.

The cracking catalysts have pore diameters of at least about 6A.

Representative materials include synthesized crystalline aluminosilicate zeolites such as zeolites Y, L, X, beta and ZSM-4 and natural materials such as faujasite and mordenite. Zeolites Y and X are preferred and xeolite Y is especially preferred. The process of this invention can be practiced with mixed catalyst systems provided at least one component of the system is a large pore, alkali metal crystalline zeolite cracking catalyst as described. Because the catalyst of the present invention is used in the sodium form, and preferably is used neat, it will be significantly cheaper, in many instances, to obtain the zeolite, in an as synthesized, wet form from the catalyst manufacturing plant, after crystallination but before drying. This will eliminate many costly steps of catalyst manufacture and provide the zeolite in an ideal form for use herein.

SHAPE SELECTIVE ADDITIVES

In many instances, it will be beneficial if one or more shape selective, highly siliceous zeolites, such as ZSM-5 is present. These zeolites may either be used in the sodium form, or in the hydrogen form. These zeolites are very resistent to catalyst deactivation, because of their high silica/alumina molar ratios. When these zeolites are added they will effect a measure of dewaxing of the heavy feed, and some cracking of gasoline boiling range normal paraffins, to increase the octane number of the gasoline product. A significant amount of light olefin upgrading may also occur.

Any zeolite having a constraint index of 1–12 can be used herein as a shape selective zeolite additive. Details of the Constraint Index test procedures are provided in J. Catalysis 67, 218–222 (1981) and in U.S. Pat. No. 4,711,710 (Chen et al), both of which are incorporated herein by reference.

Preferred shape selective zeolites are exemplified by ZSM-5, ZSM-11, ZSM-12, ZSM-23, ZSM-35, ZSM-48, ZSM-57 and similar materials.

ZSM-5 is described in U.S. Pat. No. 3,702,886, U.S. Reissue No. 29,948 and in U.S. Pat. No. 4,061,724 (describing a high silica ZSM-5 as "silicalite").

ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-57 is described in U.S. Pat. No. 4,046,859.

These patents are incorporated herein by reference.

Zeolites in which some other framework element is present in partial or total substitution of aluminum can be advantageous. Elements which can be substituted for part of all of the framework aluminum are boron, gallium, zirconium, titanium and other trivalent metals which are heavier than aluminum. Specific examples of such catalysts include ZSM-5 or zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

When shape selective zeolites are added, preferably relatively high silica shape selective zeolites are used, i.e., with a silica/alumina ratio above 20/1, and more preferably with a ratio of 70/1, 100/1, 500/1 or even higher.

Preferably the shape selective zeolite is placed in the hydrogen form by conventional means, such as exchange with ammonia and subsequent calcination. The zeolite may be used in any form which promotes a desired reaction, e.g., hydrogen form for paraffin dehydrogenation or exchanged or modified with gallium to promote aromatization.

The shape selective zeolite can be used neat, but preferably is contained in a matrix. The matrix can be the same as that used as the matrix for the large pore zeolite. Preferably the matrix for the shape selective zeolite is highly siliceous. This will reduce the affinity of the shape selective zeolite for metal present in feed, e.g., Ni and/or V. These silica bound shape selective zeolites will have a very low metal affinity.

VERY LARGE PORE CRACKING COMPONENT

In addition to the large-pore and shape selective cracking components described above which have found extensive use commercially, several recently developed very large-pore cracking components may also be used. All of these materials have an equivalent pore size greater than 7 Angstroms. Some are molecular sieves (such as VPI-5) while others are not (expanded clays).

VPI-5 is a molecular sieve with pores larger than about 10 Angstrom units in diameter. It is an aluminophosphate-sieve with 18-membered rings of T-atoms. They resemble the better known $ALPO_4$-5 materials. Such molecular sieves have very large pore volumes, and extremely large pore openings. Such large pore sieves would be very useful for cracking the very large molecules associated with high boiling or residual fractions. VPI-5 was described by M. Davis, C. Saldarriaga, C. Montes, and J. Garces in a paper presented at "Innovations in Zeolite Materials Science" Meeting in Nieuwpoort, Belgium, Sept. 13–17, 1987. M. E. Davis, C. Saldarriaga, C. Montes, J. Garces and C. Crowder, Nature 331, 698 (1988).

Pillarea, interlayered clays or silicates may also be used as a very large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica are added to smectites to increase the interplatelet distances. U.S. Pat. No. 4,515,901 and U.S. Pat. No. 4,367,163 are incorporated herein by reference.

U.S. Pat. No. 4,757,041, which is incorporated herein by reference, discloses a class of pillared interlayered clay molecular sieve products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the very "large pore" cracking component of the catalyst of the present invention.

Published European patent application EP No. 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the very large pore cracking component of the present invention.

Published European Application EP No. 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, which have a three dimensional crystal framework of suitable size may also be used as the large pore cracking component. U.S. Pat. No. 4,440,871 and U.S. Pat. No. 4,741,892 and U.S. Pat. No. 4,689,138, which are incorporated herein by reference, disclose silicoalumino phosphate moleuclar sieves.

CRACKING CONDITIONS

The cracking operation of this invention is carried out by contacting a hydrocarbon oil, e.g., a gas oil, with a cracking catalyst as previously described and a cracking-promoting amount of oxygen. Any suitable source of oxygen can be used, e.g., molecular oxygen, ozone, peroxide, etc. However, for reasons of economy, air is preferred.

The conditions of temperature, catalyst to oil ratio, and contact time can be selected from any of those known to be suitable in catalytic cracking to provide lower boiling range products including gasoline, distillate, light olefins, and so forth. In general, temperatures of from about 1000° to about 1350° F., preferably from about 1100° to about 1300° F., catalyst to oil ratios of from about 0.01 to about 10, preferably from about 0.1 to about 1, and contact times of from about 0.01 to about 100 seconds, preferably from about 0.05 to about 10 seconds, can be used with good results.

CATALYTIC OXYGEN

The amount of oxygen required to effectively promote the conversion will depend in part on the nature of the cracking catalyst selected, the cracking conditions and related factors as will be apparent to those skilled in this art. Ordinarily, only that amount of oxygen should be employed as will exhibit a significant promoting effect. The use of oxygen well in excess of such an amount is unnecessary and moreover, may result in undesirable combustion of valuable feed stock and/or product and exotherms which may place undue stress on reactor equipment. In general, from about 0.001 to about 0.1 parts by weight, and preferably from about 0.005 to about 0.07 parts by weight, of oxygen for each weight part of hydrocarbon oil will provide a significant increase in the rate of conversion of the charge to desired products.

It is desirable to introduce the oxygen close to the point where the hydrocarbon oil contacts the catalyst. For example, in a riser type fluidized catalytic cracking unit, the oxygen can be introduced along with freshly regenerated catalyst to the riser, usually as the base thereof, where the catalyst/oxygen mixture becomes combined with the incoming hydrocarbon charge.

The promoting-amount of oxygen can be introduced continuously at constant pressure or intermittently and can be provided as a single stream or as two or more streams at different horizontal and/or vertical locations on the cracking reactor.

COMBUSTION PROMOTER

The catalyst used in the catalytic cracking reactor should be essentially free of any shape selective combustion catalyst. We do require such combustion catalyst, it is expensive, and for that reason need not be present in the catalyst.

CATALYST ADDITION

The catalyst preferably comprises neat large pore zeolite. The zeolite is the active ingredient and is usually placed in a matrix to make it easier to hold and transport the catalyst, give it strength, and a measure of sodium resistance for use in conventional catalytic cracking units. In the process of our invention, the catalyst can be highly dispersed, and is preferably used only once through, so the catalyst need not have a high crush strength. In many ways it is beneficial if the catalyst is used in a finely dispersed state, so use of a neat, sodium form zeolite in a suspending liquid (either water or preferably a heavy hydrocarbon) is preferred as an efficient way of getting the catalyst into the reaction zone.

The large pore zeolite may also be placed in a matrix. For reasons of economy, it may be cheaper in many instances to simply use conventionally available cracking catalyst, such as a USY zeolite in a matrix, and put these catalysts in, e.g., the sodium form, before use.

Spent FCC or TCC catalyst, after further processing to put it in the alkali metal form, may also be used as an economical source of catalyst.

As previously discussed, it will be beneficial if one or more shape selective zeolites, such as ZSM-5 is present. These zeolites may either be used in the sodium form, or in the hydrogen form. These zeolites are typically very resistent to catalyst deactivation, because of their high silica/alumina molar ratios. When these zeolites are added they will effect a measure of dewaxing of the heavy feed, and some cracking of gasoline boiling range normal paraffins, to increase the octane number of the gasoline product. Any zeolite having a constraint index of 1-12, and silica:alumina ratio in excess of 12 many be used as a shape selective additive herein.

CIRCULATING FLUID BED COMBUSTOR (CFB)

In commercial use, the greatest difficulty in practicing the process of the present invention will be in getting a high temperature heat source needed to make the process work. Heat exchange of feed with reactor effluent can be used to achieve much of the high temperature required, e.g., to get the hot oil stream up to about 500°-700° F. Such heat exchange will even bring about a moderate amount of visbreaking or thermal cracking, which is beneficial.

The hard heating step is achieving reactor temperatures in the range 1100°-1300° F. It is not practical to obtain such high temperature via heat exchange, and somewhat difficult to obtain such high temperatures in conventional fired heaters.

In the process of our invention, we can use a circulating fluid bed combustor, CFB, as a cost effective method generating the high temperature heat needed for the process of the present invention.

More details on the integration of CFB units and FCC units may be taken from U.S. Pat. No. 4,784,748, which is incorporated herein by reference.

FLUID COKER

Use of a circulating, fluidized bed of coke is another good way of supplying the high temperature heat needed for process of the present invention.

EXAMPLE 1

A sodium zeolite Y having the following properties was prepared substantially as described in U.S. Pat. No. 3,130,007, the contents of which are incorporated by reference herein:

| | |
|---|---|
| Catalyst Surface Area | 582 m²/g |
| SiO₂/Al₂O₃ (molar) | 5.12 |
| Na | 7.10% |
| Adsorption Capacity, cyclohexane at 40 Torr cyclohexane | 18.90% |
| Adsorption Capacity, n-hexane at 40 Torr n-hexane | 17.90% |
| Unit Cell Lattice Parameter | 24.70% |

An Arabian Light Gas Oil with the properties shown in Table 1 was reacted over 0.504 grams (about 1 cc) of the above NaY catalyst (30-80 mesh) in a fixed bed tubular reactor. As a diluent gas, 40 cc/min (STP) of nitrogen was introduced along with the oil. The cracking operation was carried out at atmospheric pressure and with 0.2 seconds contact. The gas and the liquid were combined immediately before contacting the catalyst. Reaction temperature was maintained constant throughout the run at 1167° F. (630° C.). Gaseous and liquid products were analyzed by conventional gas chromatography techniques. The product distributions from this operation at 5 and 15 minutes on stream are shown in Table 2.

TABLE 1

Properties of Arab Light Gas Oil Used In These Studies

| | |
|---|---|
| API Gravity, 60° F. | 21.5 |
| Aniline Point, °F. | 164.5 |
| Pour Point, °F. | 95 |
| Bromine No. | 6.2 |
| KV at 100° C. | 5.47 |
| Molecular Weight, avg. | 381 |
| Refractive Index, 60° C. | 1.493 |
| Density, 70° C. | 0.885 |
| Sulfur, Wt % | 2.25 |
| Nitrogen, ppm | 900 |
| Basic Nitrogen, ppm | 401 |
| CCR, wt % | 0.42 |
| Hydrogen, wt % | 11.98 |
| Boiling Point Distribution | |
| 75° to 330° F. | 0.0 |
| 330° to 420° F. | 0.4 |
| 420° to 650° F. | 14.4 |
| 650° to 850° F. | 52.7 |
| 850° F. | 32.5 |

TABLE 2

Conversion of Arabian Light Gas Oil Over NaY Catalyst (N₂ added with oil*)

| Run number | Feed | 1 | 2 |
|---|---|---|---|
| Time on Stream, min | — | 5 | 15 |
| Temperature, °C. | — | 630 | |
| WHSV, hr⁻¹ | — | 190 | 190 |
| LHSV, hr⁻¹ | — | 95 | 95 |
| Mass balance, wt % | — | 96.1 | 95.3 |
| Product Analysis, wt % | | | |
| $C_1$ | | 3.2 | 3.4 |
| $C_2$ | | 7.8 | 7.6 |
| $C_3$ | | 3.5 | 3.7 |
| i-$C_4$ | | 0.1 | 0.1 |
| n-$C_4$ | | 0.1 | 0.1 |
| $C_4^=$ | | 0.8 | 0.7 |
| $C_5$ - 330° F. | — | 12.2 | 11.8 |
| 330°-420° F. | 0.4 | 4.7 | 4.5 |
| 420°-650° F. | 14.4 | 14.3 | 12.2 |
| 650°-850° F. | 52.7 | 37.3 | 36.1 |
| 850° F.+ | 32.5 | 14.4 | 18.2 |
| % Coke | — | 0.7 | 0.7 |
| Product Selectivities** | | | |
| Dry Gas | | 32.7 | 32.8 |
| $C_4^=$ | | 48.8 | 49.3 |
| $C_5$ to 330° F. | | 36.3 | 35.2 |
| $C_5$ to 420° F. | | 49.1 | 47.5 |
| 420° to 650° F. | | — | — |
| Coke | | 2.1 | 2.1 |
| Conversion to 650° F.⁻ | | 33.6 | 33.5 |
| Conversion to 420° F.⁻ | | 33.6 | 33.5 |
| Conversion to 330° F.⁻ | | 29.3 | 29.0 |

*Gas Flow Rate = 40 cc (STP)/cc cat/min.
**Based on Conversion to 650° F.

As the data in Table 2 show, conversions are very low. The product obtained is principally the result of thermal cracking. Thus, the alkali metal zeolite is not suitable by itself as a cracking catalyst.

EXAMPLE 2

The same Arabian light gas oil described in Example 1 was reacted over 0.507 grams of the fresh sample of the identical NaY catalyst at a contact time of 0.2 seconds and 1167° F. (630° C.) at atmospheric pressure. Instead of nitrogen, a 40 vol. % oxygen/60 vol. % nitrogen gas mixture was added at a rate of 40 cc/min (STP) along with the feed in an identical manner as in Example 1. This represents 0.022 parts of oxygen per part of gas oil feed. The product distributions from this operation, as determined from gas chromatographic analyses, are shown in Table 3 for 5 and 15 minutes on stream.

TABLE 3

Conversion of Arabian Light Gas Oil Over NaY Catalyst (40 vol. % O₂/60 vol. % N₂ added with oil*)

| Run number | Feed | 3 | 4 |
|---|---|---|---|
| Time on Stream, min | — | 5 | 15 |
| Temperature, °C. | | 630 | |
| WHSV, hr⁻¹ | — | 190 | 190 |
| LHSV, hr⁻¹ | — | 95 | 95 |
| Mass balance, wt % | — | 93.4 | 94.3 |
| Product Analysis, wt % | | | |
| CO + CO₂ + H₂O | | 2.5 | 2.7 |
| $C_1$ | | 3.7 | 2.6 |
| $C_2$ | | 10.5 | 8.1 |
| $C_3$ | | 1.2 | 0.5 |
| $C_3^=$ | | 6.1 | 2.3 |
| i-$C_4$ | | 0.1 | 0.1 |
| n-$C_4$ | | 0.1 | 0.1 |
| $C_4^=$ | | 2.4 | 0.9 |
| $C_5$ - 330° F. | — | 25.2 | 23.4 |
| 330°-420° F. | 0.4 | 8.9 | 7.6 |
| 420°-650° F. | 14.4 | 21.4 | 28.8 |
| 650°-850° F. | 52.7 | 13.8 | 18.2 |
| 850° F.+ | 32.5 | 3.2 | 3.9 |
| % Coke | — | 0.8 | 0.8 |
| Product Selectivities* | | | |

TABLE 3-continued

Conversion of Arabian Light Gas Oil Over NaY Catalyst
(40 vol. % $O_2$/60 vol. % $N_2$ added with oil*)

| Run number | Feed | 3 | 4 |
|---|---|---|---|
| Dry Gas | | 21.5 | 18.0 |
| $C_4^-$ | | 36.5 | 24.5 |
| $C_5$ to 330° F. | | 38.2 | 39.3 |
| $C_5$ to 420° F. | | 51.1 | 50.7 |
| 420° to 650° F. | | 11.2 | 22.3 |
| Coke | | 1.2 | 1.5 |
| Conversion to 650° F.$^-$ | | 67.7 | 61.2 |
| Conversion to 420° F.$^-$ | | 60.7 | 18.2 |
| Conversion to 330° F.$^-$ | | 52.2 | 40.0 |

*Gas Flow Rate = 40 cc (STP)/cc cat/min.
**Based on Conversion to 650° F.
***Selectivities and Conversion values do not include CO, $CO_2$ or $H_2O$ The conversions approximately doubled compared to those obtained in Example 1, dramatically showing the promoting effect of oxygen.

EXAMPLE 3

This example demonstrates that alkali metal zeolite has only slightly greater catalytic activity than sand which is regarded as having no catalytic activity at all.

The same Arabian light gas oil described in Example 2 was reacted over 1.4 grams (about 1 cc) of sand at a contact of 0.2 seconds at a temperature of 1167° F. (630° C.) at atmospheric pressure in the same tubular reactor used in the previous examples. As in Example 1, 40 cc/min (STP) of nitrogen was added along with the oil as a diluent. The product distributions from this operation, as determined from gas chromatographic analyses, are shown in Table 4 for 5 and 15 minutes on stream.

TABLE 4

Conversion of Arabian Light Gas Oil Over Sand
($N_2$ added with oil*)

| Run number | Feed | 5 | 6 |
|---|---|---|---|
| Time on Stream, min | — | 5 | 15 |
| Temperature, °C. | — | 630 | |
| WHSV, hr$^{-1}$ | — | 69 | 69 |
| LHSV, hr$^{-1}$ | — | 95 | 95 |
| Mass balance, wt % | — | 96.1 | 95.3 |
| Product Analysis, wt % | | | |
| $C_1$ | | 3.8 | 3.5 |
| $C_2$ | | 6.7 | 6.2 |
| $C_3$ | | 1.0 | 1.0 |
| $C_3=$ | | 3.3 | 3.4 |
| i-$C_4$ | | 0.1 | 0.1 |
| n-$C_4$ | | 0.7 | 0.6 |
| $C_4=$ | | 7.4 | 7.2 |
| $C_5$ - 330° F. | — | 3.8 | 3.8 |
| 420°-650° F. | 14.4 | 10.9 | 11.1 |
| 650°-850° F. | 2.7 | 40.7 | 41.4 |
| 850° F.+ | 32.5 | 21.4 | 21.5 |
| % Coke | — | 0.1 | 0.1 |
| Product Selectivities** | | | |
| Dry Gas | | 39.5 | 37.9 |
| $C_4^-$ | | 59.0 | 58.2 |
| $C_5$ to 330° F. | | 27.8 | 28.1 |
| $C_5$ to 420° F. | | 40.6 | 41.4 |
| 420° to 650° F. | | — | — |
| Coke | | 0.4 | 0.4 |
| Conversion to 650° F.$^-$ | | 26.6 | 25.6 |
| Conversion to 420° F.$^-$ | | 26.6 | 25.6 |
| Conversion to 330° F.$^-$ | | 23.1 | 22.1 |

*Gas Flow Rate = 40 cc (STP)/cc cat/min.
**Based on Conversion to 650° F.

These data show that the conversion products of the operation of Example 1 resulted for the most part from thermal cracking and not from the presence of NaY.

EXAMPLE 4

This example demonstrates that both alkali metal zeolite and a promoting amount of oxygen must be present to achieve catalytic cracking.

The nitrogen used in Example 3 was replaced with a stream of 40 vol. % oxygen/60 vol. % nitrogen at the same gas flow rate and same reaction conditions used in the preceding examples. Analysis of the product from this operation after 15 minutes on stream is shown in Table 5.

TABLE 5

Conversion of Arabian Light Gas Oil Over Sand
(40 vol. % $O_2$/60 vol. % $N_2$ added with oil*)

| Run number | Feed | 7 |
|---|---|---|
| Time on Stream, min | — | 15 |
| Temperature, °C. | — | 630 |
| WHSV, hr$^{-1}$ | — | 69 |
| LHSV, hr$^{-1}$ | — | 95 |
| Mass balance, wt % | — | 97.4 |
| Product Analysis, wt % | | |
| CO + $CO_2$ + $H_2O$ | | 2.3 |
| $C_1$ | | 3.2 |
| $C_2$ | | 5.5 |
| $C_3$ | | 0.9 |
| $C_3=$ | | 3.7 |
| i-$C_4$ | | 0.1 |
| n-$C_4$ | | 0.1 |
| $C_4=$ | | 1.5 |
| $C_5$ - 330° F. | — | 10.7 |
| 330°-420° F. | 0.4 | 4.2 |
| 420°-650° F. | 14.4 | 10.4 |
| 650°-850° F. | 52.7 | 38.9 |
| 850° F.+ | 32.5 | 18.4 |
| % Coke | — | 0.1 |
| Product Selectivities** | | |
| Dry Gas | | 29.4 |
| $C_4^-$ | | 50.7 |
| $C_5$ to 330° F. | | 36.1 |
| $C_5$ to 420° F. | | 49.0 |
| 420° to 650° F. | | — |
| Coke | | 0.3 |
| Conversion to 650° F.$^-$ | | 30.3 |
| Conversion to 420° F.$^-$ | | 30.3 |
| Conversion to 330° F.$^-$ | | 26.5 |

*Gas Flow Rate = 40 cc (STP)/cc cat/min.
**Based on Conversion to 650° F.
***Selectivities and Conversion values do not include CO, $CO_2$ or $H_2O$ As these data show, the conversions were much like those obtained in Examples 1 (no oxygen present) and 3 (no alkali metal zeolite present) thus showing the need for both the alkali metal zeolite and promoting amount of oxygen.

What is claimed is:

1. A catalytic cracking catalyst comprising a large pore alkali metal zeolite and a shape selective zeolite additive having a Constraint Index of 1–12 and a silica:alumina ratio in excess of 12, said cracking catalyst being essentially free of shape selective combustion catalyst.

2. The catalyst of claim 1 wherein the cracking catalyst comprises a crystalline aluminosilicate zeolite which, in the hydrated form, is represented by the formula $$M_2O:Al_2O_3:wSiO_2:yH_2O$$

wherein M represents an alkali metal, n represents the valence of the cation, w represents the moles of $SiO_2$ and y represents the moles of $H_2O$.

3. The catalyst of claim 2 where M is sodium.

4. The catalyst of claim 2 where the crystalline aluminosilicate zeolite cracking catalyst is sodium Y.

5. The catalyst of claim 2 wherein the crystalline aluminosilicate zeolite cracking catalyst has a pore diameter of at least about 6A.

6. The catalyst of claim 1 wherein the cracking catalyst comprises at least one of VPI-5, SAPO-34, pillared clays, and pillared silicates.

7. The catalyst of claim 1 wherein the additive zeolite has a silica:alumina ratio above 100:1.

8. The catalyst of claim 1 wherein the additive zeolite is in the hydrogen form.

9. The catalyst of claim 1 wherein the additive zeolite is in the alkali metal form.

10. The catalyst of claim 1 wherein said cracking catalyst consists essentially of a large pore alkali metal crystalline silicate zeolite.

11. The catalyst of claim 10 wherein said cracking catalyst is sodium Y.

* * * * *